(12) United States Patent
Kim et al.

(10) Patent No.: US 9,019,355 B2
(45) Date of Patent: Apr. 28, 2015

(54) DISPLAY APPARATUS AND DRIVING METHOD OF THE SAME

(75) Inventors: Hyung-rae Kim, Seoul (KR); Tae-hyeun Ha, Suwon-si (KR); Jae-sung Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 890 days.

(21) Appl. No.: 12/912,248

(22) Filed: Oct. 26, 2010

(65) Prior Publication Data

US 2011/0298905 A1  Dec. 8, 2011

(30) Foreign Application Priority Data

Jun. 7, 2010  (KR) .................. 10-2010-0053293

(51) Int. Cl.
*H04N 13/04* (2006.01)
*H04N 13/00* (2006.01)

(52) U.S. Cl.
CPC ....... *H04N 13/0497* (2013.01); *H04N 13/0025* (2013.01)

(58) Field of Classification Search
CPC .......... H04N 13/0438; H04N 13/0497; H04N 13/0434; H04N 13/0409; H04N 13/0418; H04N 13/00; H04N 13/0486; H04N 13/0025; G09G 3/3406; G09G 2310/0237
USPC ........ 349/15; 345/102, 690, 691, 87, 419, 15, 345/61; 348/42, 54, 56, 51; 12/225, 716; 362/97.2
See application file for complete search history.

(56) References Cited

U.S. PATENT DOCUMENTS

| | | | |
|---|---|---|---|
| 6,977,629 B2 * | 12/2005 | Weitbruch et al. | 345/6 |
| 7,505,016 B2 * | 3/2009 | Kwon | 345/87 |
| 2008/0303963 A1 | 12/2008 | Jung et al. | |
| 2009/0103177 A1 * | 4/2009 | Jang et al. | 359/462 |
| 2010/0225836 A1 * | 9/2010 | Ockenfuss | 349/15 |
| 2010/0238274 A1 * | 9/2010 | Kim et al. | 348/51 |

FOREIGN PATENT DOCUMENTS

| | | |
|---|---|---|
| EP | 2085961 A1 | 8/2009 |
| EP | 2113905 A1 | 11/2009 |

OTHER PUBLICATIONS

Communication dated Oct. 19, 2012 issued by the European Patent Office in counterpart European Patent Application No. 10191162.6.
Communication dated Feb. 3, 2015 issued by European Patent Office in counterpart European Application No. 10191162.6.

* cited by examiner

*Primary Examiner* — Sath V Perungavoor
*Assistant Examiner* — Nathnael Aynalem
(74) *Attorney, Agent, or Firm* — Sughrue Mion, PLLC

(57) ABSTRACT

A display apparatus and a method of driving the same for performing local dimming that is suitable for displaying a three-dimensional (3D) image. The display apparatus receives a video signal containing a left-eye image and a right-eye image, processes the video signal, displays a three-dimensional (3D) image on the basis of the processed video signal, emits light to a display unit by local dimming, and controls the light source unit to be driven based on dimming information about at least one of the left-eye image and the right-eye image.

18 Claims, 5 Drawing Sheets

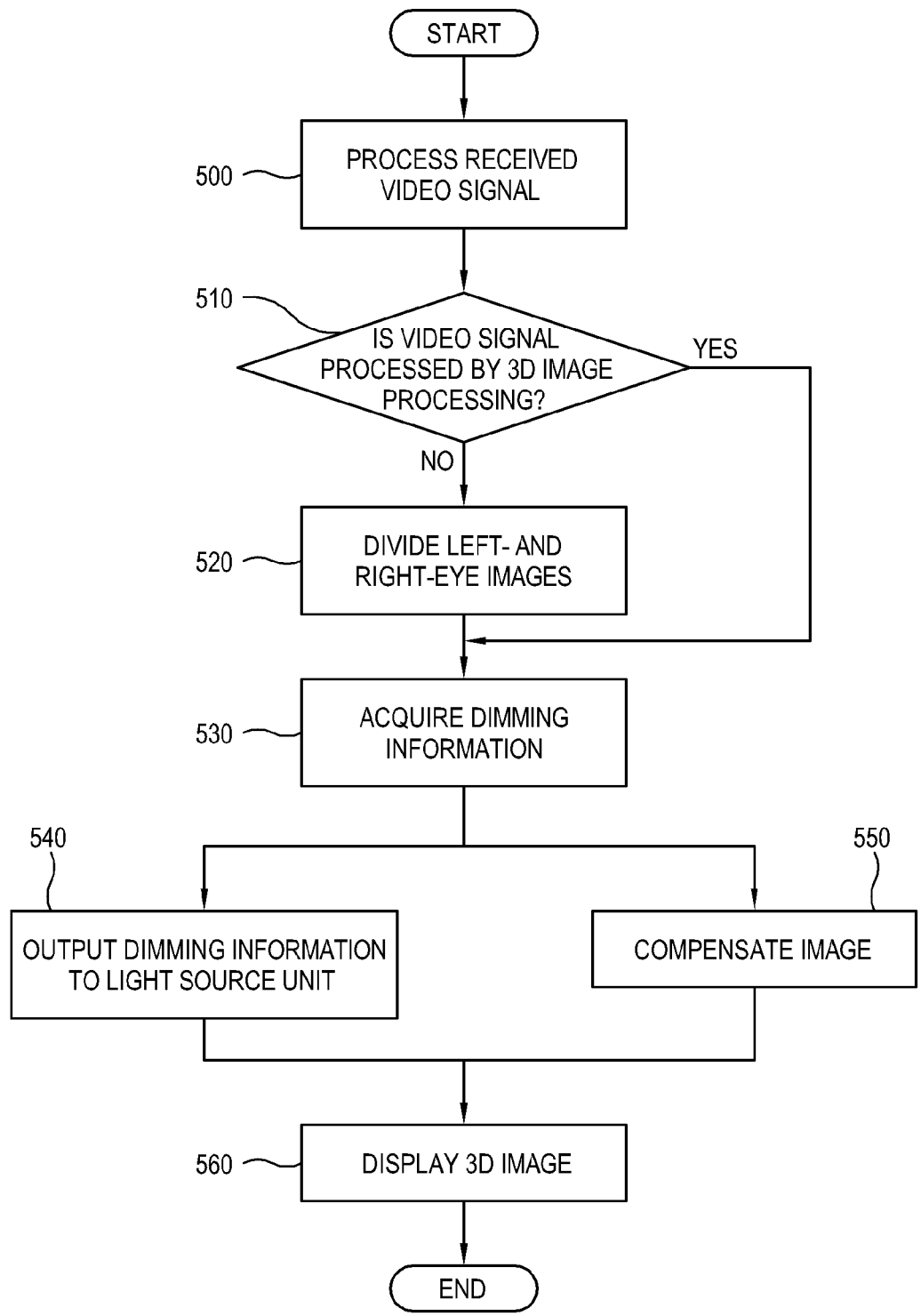

DISPLAY APPARATUS AND DRIVING METHOD OF THE SAME

CROSS-REFERENCE TO RELATED APPLICATION

This application claims priority from Korean Patent Application No. 10-2010-0053293, filed on Jun. 7, 2010 in the Korean Intellectual Property Office, the disclosure of which is incorporated herein by reference.

BACKGROUND

1. Field

Apparatuses and methods consistent with the exemplary embodiments relate to a display apparatus and a method of driving the same, and more particularly, to a display apparatus capable of performing local dimming that is suitable for a three-dimensional (3D) image and a method of driving the same.

2. Description of the Related Art

A three-dimensional (3D) image displayed by a display apparatus, such as a television (TV) or the like, has a cubic effect on an object through binocular parallax, which is a major factor of the cubic effect at short distance. To this end, the display apparatus alternately displays a left-eye image and a right-eye image with regard to a scene, thereby displaying an image.

Meanwhile, a local dimming method has recently been used to enhance a contrast ratio of an image. This method divides a light source into a plurality of light emitting blocks, and controls the light emitting blocks to have the amount of light corresponding to a contrast in a display region.

The local dimming method is effective in displaying a two-dimensional (2D) image. However, in the case of a 3D image, it is difficult for the local dimming method to drive the light source in accordance with a displayed image since the left-eye image and the right-eye image are alternately displayed and are different from each other.

SUMMARY

Accordingly, one or more exemplary embodiments provide a display apparatus capable of performing local dimming that is suitable for a 3D image, and a method of driving the same.

According to an exemplary embodiment, a display apparatus includes a signal receiver that receives a video signal, the video signal including a left-eye image and a right-eye image; a signal processor which processes the received video signal; a display unit which displays a three-dimensional (3D) image on the basis of the processed video signal; a light source unit that emits light to the display unit; and a controller which transmits dimming information of at least one of the left-eye image and the right-eye image of the processed video signal to the light source unit and controls the light source unit to be driven on the basis of the dimming information.

The controller may include a first dimming information unit that acquires dimming information of the right-eye image and a second dimming information unit that acquires dimming information of the left-eye image.

The controller may compensate the left-eye image and the right-eye image for brightness on the basis of the dimming information.

The controller may control a value of brightness compensation for the left-eye image and the right-eye image to be inversely proportional to a value of the dimming information.

The controller may provide the dimming information about the left-eye image and dimming information about the right-eye image to the light source unit, and the light source unit emits light corresponding to the left-eye image and the right-eye image displayed on the display unit.

The controller may provide only one of dimming information about the left-eye image and the right-eye image to the light source unit.

The controller may provide an average value of dimming information about the left-eye image and the right-eye image to the light source unit.

The controller may provide a maximum value of dimming information about the left-eye image and the right-eye image to the light source unit.

The controller may provide a minimum value of dimming information about the left-eye image and the right-eye image to the light source unit.

The controller may acquire the dimming information based on one of a video signal in which the left-eye image and the right-eye image are included in one frame, and a video signal in which the left-eye image and the right-eye image form respective frames.

The controller may divide the video signal into the left-eye image and the right-eye image and acquire the dimming information based on the divided left-eye image and right-eye image.

The controller may output the video signal of which the left-eye image and the right-eye image compensated based on the dimming information.

The controller may acquire the dimming information based on a correlation between neighboring left-eye images and between neighboring right-eye images.

According to an exemplary embodiment, a method of driving a display apparatus, including a plurality of light emitting diodes (LEDs), and a light source unit emitting light by local dimming, includes processing a video signal, the video signal including a left-eye image and a right-eye image; providing dimming information about at least one of the left-eye image and the right-eye image to the light source unit; driving the light source unit based on the dimming information; and displaying a three-dimensional (3D) image based on the driven light source unit.

The providing the dimming information may include acquiring dimming information of the left-eye image; and acquiring dimming information of the right-eye image.

The providing the dimming information may include compensating the left-eye image and the right-eye image for brightness on the basis of the dimming information.

The compensating the left-eye image and the right-eye image may include compensating a value of brightness compensation for the left-eye image and the right-eye image to be inversely proportional to a value of the dimming information.

The providing the dimming information may include providing each dimming information about the left-eye image and dimming information about the right-eye image to the light source unit, and the displaying the 3D image may include emitting light corresponding to the displayed left-eye and right-eye images.

The providing the dimming information may include providing only one of dimming information about the left-eye image and the right-eye image to the light source unit.

The providing the dimming information may include providing an average value of dimming information about the left-eye image and the right-eye image to the light source unit.

The providing the dimming information may include providing a maximum value of dimming information about the left-eye image and the right-eye image to the light source unit.

The providing the dimming information may include providing a minimum value of dimming information about the left-eye image and the right-eye image to the light source unit.

The providing the dimming information may include acquiring the dimming information based on one of a video signal in which the left-eye image and the right-eye image are included in one frame, and a video signal in which the left-eye image and the right-eye image form respective frames.

The providing the dimming information may include dividing the video signal into the left-eye image and the right-eye image and acquiring the dimming information based on the divided left-eye image and right-eye image.

The providing the dimming information may include outputting the video signal of which the left-eye image and the right-eye image compensated based on the dimming information.

The providing the dimming information may include acquiring the dimming information based on a correlation between neighboring left-eye images and between neighboring right-eye images.

BRIEF DESCRIPTION OF THE DRAWINGS

The above and/or other aspects will become apparent and more readily appreciated from the following description of the exemplary embodiments, taken in conjunction with the accompanying drawings, in which:

FIG. 5 is a flowchart showing operation of a display apparatus according to an exemplary embodiment.

DETAILED DESCRIPTION OF EXEMPLARY EMBODIMENTS

Figure 1:
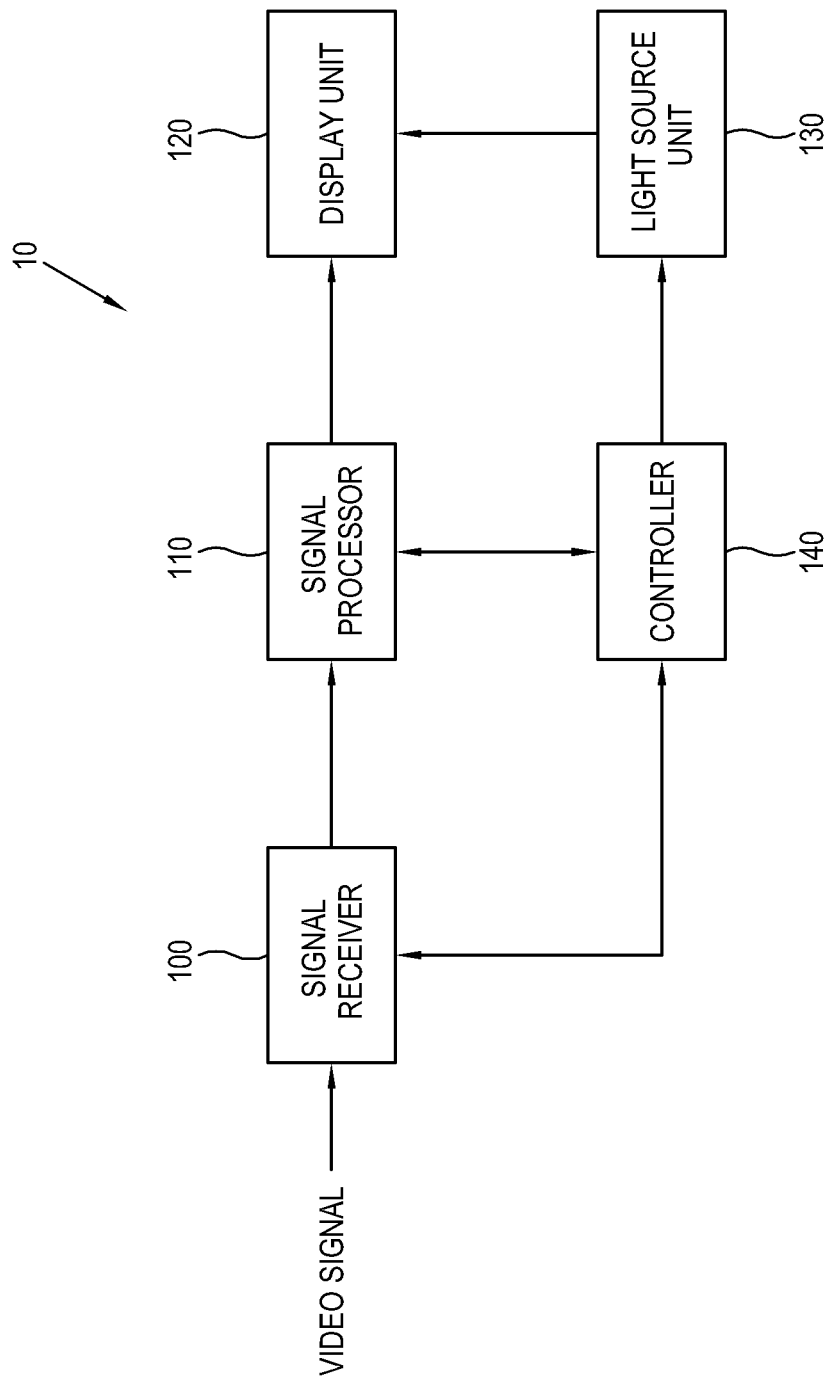
FIG. 1 is a block diagram showing a configuration of a display apparatus according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 is a block diagram showing a configuration of a display apparatus according to an exemplary embodiment.

As shown in FIG. 1, a display apparatus 10 according to this exemplary embodiment includes a signal receiver 100, a signal processor 110, a display unit 120, a light source unit 130, and a controller 140.

The signal receiver 100 receives a video signal that includes a left-eye image and a right-eye image. The left-eye image and the right-eye image included in the video signal may have various formats, such as side by side, top and bottom, check box, line by line, etc.

The video signal received by the signal receiver 100 may include a broadcasting signal, such as a digital television (DTV) signal, a cable broadcasting signal, etc. In this case, the signal receiver 100 may be tuned to a channel selected by a user and receives a broadcasting signal of the tuned channel under control of the controller 140. Further, the video signal received by the signal receiver 100 may include a signal output from a video source, such as a digital versatile disc (DVD), a Blu-ray disc (BD), etc. Although not shown, the signal receiver 100 may receive an audio signal for outputting sound, a data signal for outputting data information, etc. In this exemplary embodiment, a broadcasting signal may include a video signal, an audio signal, and a data signal.

The signal processor 110 performs signal processing so that a received video signal, including a left-eye image and a right-eye image, can be displayed as a three-dimensional (3D) image on the display unit 120. The signal processing performed in the signal processor 110 may include decoding, image enhancing, scaling, etc. related to a video signal. The signal processor 110 may perform demultiplexing for dividing the broadcasting signal received through the signal receiver 100 into a video signal, an audio signal and a data signal. The signal processor 110 may also apply decoding to the audio signal and the data signal.

The signal processor 110 performs 3D image processing. That is, if the left-eye image and the right-eye image are input as being contained in one frame, the one frame is divided into the left-eye image and the right-eye image, and each of the left-eye image and the right-eye image is configured as one frame to be displayed.

The display unit 120 displays an image based on a video signal processed by the signal processor 110. The display 120 may display an image through a liquid crystal display (LCD) by way of example. In this case, the display 120 may include an LCD panel (not shown), a panel driver (not shown), etc. The display unit 120 may display the data information included in the data signal processed by the signal processor 110.

The light source unit 130 emits light to the display unit 120 in accordance with an image displayed on the display unit 120. In this exemplary embodiment, the light source unit 130 may include a light emitting diode (LED) or the like driven by local dimming. That is, the LCD panel is divided into a plurality of regions, and the brightness of the light source unit 130 can be individually adjusted for each region in accordance with gray levels of each region.

The controller 140 acquires dimming information about at least one of the left-eye image and the right-eye image, and transmits the dimming information to the light source unit 130, so that the light source unit 130 can be driven by local dimming on the basis of the dimming information. Also, the controller 140 compensates the left-eye image and the right-eye image on the basis of the local dimming. If the light source unit 130 is driven by the local dimming, low brightness, light leakage, flicker or the like may arise. Therefore, the controller 140 can compensate these problems. For example, if the dimming information is high, low compensation is implemented. On the other hand, if the dimming information is low, high compensation is implemented. If the LCD panel is used as the display panel, high compensation may mean much opening of an LCD and the low compensation may mean small opening of the LCD. The controller 140 may be a microprocessor or a central processing unit (CPU) that controls operations of the display apparatus 10.

Figure 2:
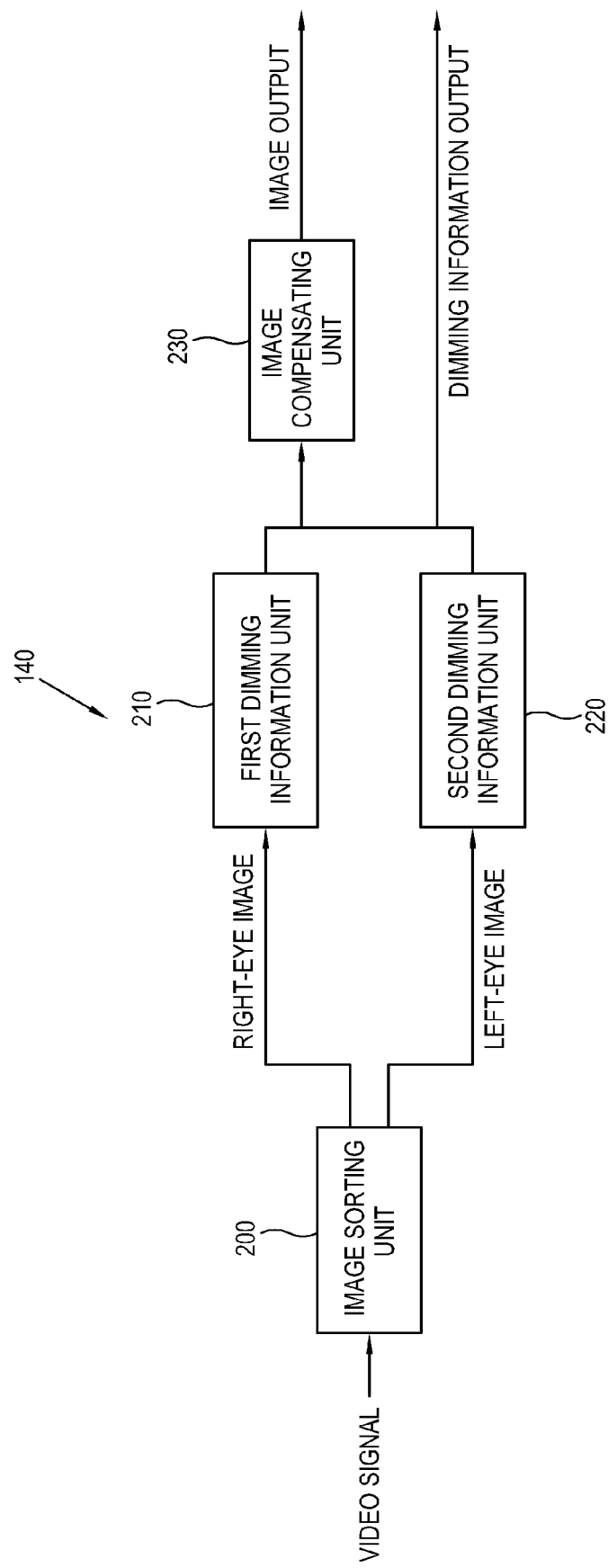
FIG. 2 is a block diagram showing a controller of a display apparatus according to an exemplary embodiment.

FIG. 2 is a detailed block diagram showing the controller 140 of the display apparatus 10 according to an exemplary embodiment.

As shown therein, the controller 140 may include an image sorting unit 200, a first dimming information unit 210, a second dimming information unit 220, and an image compensating unit 230.

The image sorting unit 200 receives the video signal that includes the left-eye image and the right-eye image. The image sorting unit 200 transmits the right-eye image to the first dimming information unit 210 and transmits the left-eye image to the second dimming information unit 220.

The first and second dimming information units 210 and 220 acquire the dimming information about the left-eye image and the right-eye image and respectively transmit the dimming information to the light source unit 130 and the image compensating unit 230. At this time, each dimming information of the left-eye image and the right-eye image may be output. Alternatively, one of an average value, a maximum value, and a minimum value of the respective dimming information may be output.

Also, the first or second dimming information unit 210 or 220 may selectively operate. In other words, the dimming information may be acquired with regard to only one of the right-eye image or the left-eye image, and then the dimming information is transmitted to the light source unit 130 and the image compensating unit 230.

The light source unit 130 drives the light source on the basis of the received dimming information to emit light. If each dimming information of the left-eye image and the right-eye image is received, the light source unit 130 drives the light source on the basis of the dimming information corresponding to the left-eye image while displaying the left-eye image, and drives the light source based on the dimming information corresponding to the right-eye image while displaying the right-eye image.

The image compensating unit 230 compensates a brightness or the like of the left-eye image and the right-eye image on the basis of the received dimming information.

Meanwhile, the image sorting unit 200 in this exemplary embodiment may receive a video signal having both the left-eye image and the right-eye image in one frame, or a video signal having the left-eye image and the right-eye image in respective frames. Below, respective operations are as follows.

For example, suppose that the display apparatus 10 acquires each dimming information of the left-eye image and the right-eye image, and operates based on each dimming information.

Figure 3:
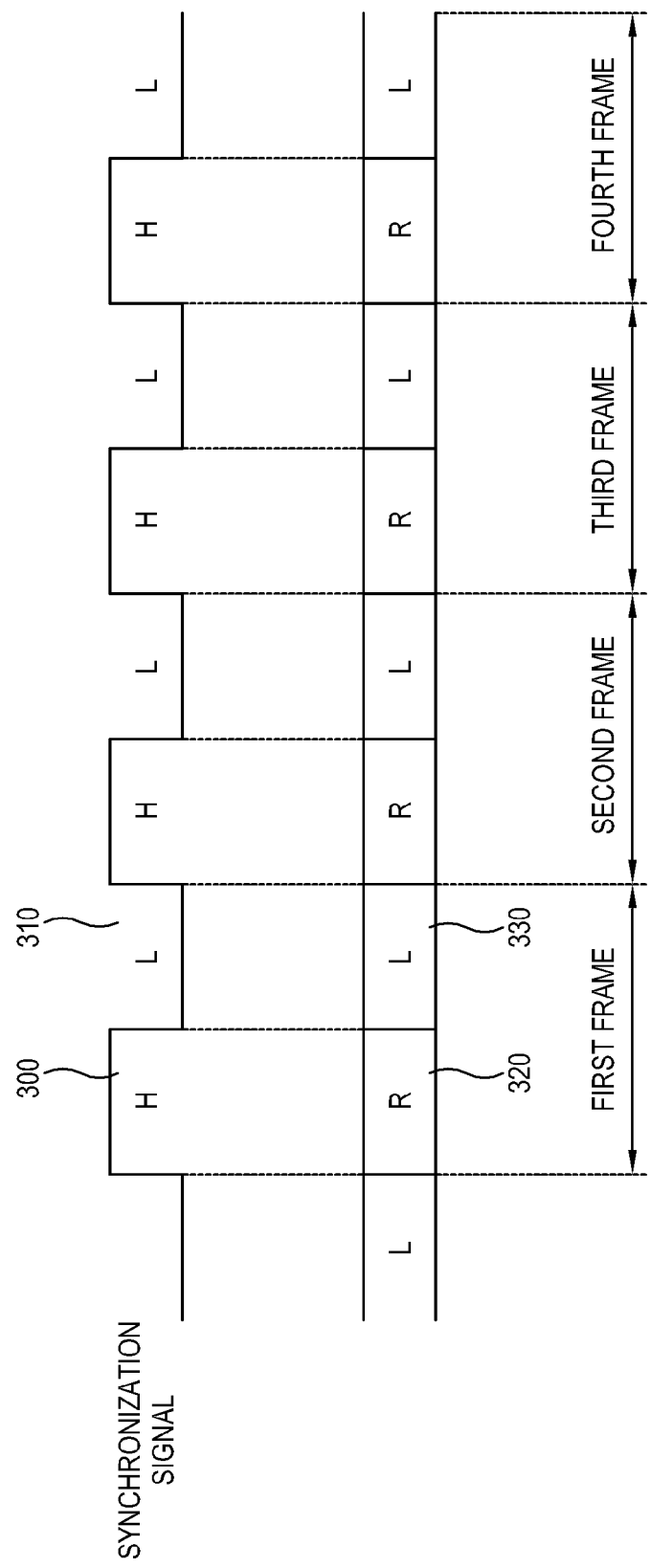
FIG. 3 is a view for explaining operation of a display apparatus according to an exemplary embodiment.

FIG. 3 is a view for explaining operation of a display apparatus according to an exemplary embodiment.

Referring to FIG. 3, the image sorting unit 200 receives a video signal in which the left-eye image and the right-eye image are all contained in one frame. In FIG. 3, H 300, L 310, R 320 and L 330 denote a high signal, a low signal, a right-eye image and a left-eye image, respectively.

FIG. 3 shows a case in which the left-eye image and the right-eye image are input by the format of side by side, in which the left-eye image and the right-eye image are alternately displayed so that an image corresponding to one frame can be perceived.

When receiving a video signal, the image sorting unit 200 divides the received video signal into the left-eye image and the right-eye image. Specifically, the right-eye image is transmitted to the first dimming information unit 210 in the case of a high signal, but the left-eye image is transmitted to the second dimming information unit 220 in the case of a low signal. The first and second dimming information units 210 and 220 acquire the dimming information and transmit the dimming information to the image compensating unit 230.

The left-eye image and right-eye image input to the image compensating unit 230 undergo 3D image processing for displaying the 3D image. In this exemplary embodiment, the signal processor 110 performs the 3D image processing. Since the video signal, including both the left-eye image and the right-eye image contained in one frame, is input to the signal processor 110, the image compensating unit 230 configures the left-eye image and the right-eye image in accordance with an input format, and transmits the configured left-eye image and the right-eye image to the signal processor 110. In this exemplary embodiment, the left-eye image and the right-eye image are configured in the format of side by side. Meanwhile, the image compensating unit 230 applies image compensation to the left-eye image and the right-eye image, and thus the image is output from the image compensating unit 230 while having the same format as the input format as it is compensated.

In the 3D image processing, the signal processor 110 in this exemplary embodiment divides and configures the left-eye image and the right-eye image as individual frames to display a 3D image. Since the left-eye image and the right-eye image are displayed alternately, the individual frames are stored in a frame memory (not shown) and then output. Accordingly, time taken to display the left-eye image and the right-eye image on the display unit 120 as being transmitted from the image compensating unit 230 to the signal processor 110 and undergoing the 3D image processing is more prolonged than time to drive the light source unit 130 by receiving the dimming information from the first and second dimming information units 210 and 220. Because the light source unit 130 has to emit light corresponding to an image displayed on the display unit 120, the first and second dimming information units 210 and 220 transmit the dimming information to the light source unit 130 in consideration of the time taken to transmit and display an image on the display unit 120.

Figure 4:
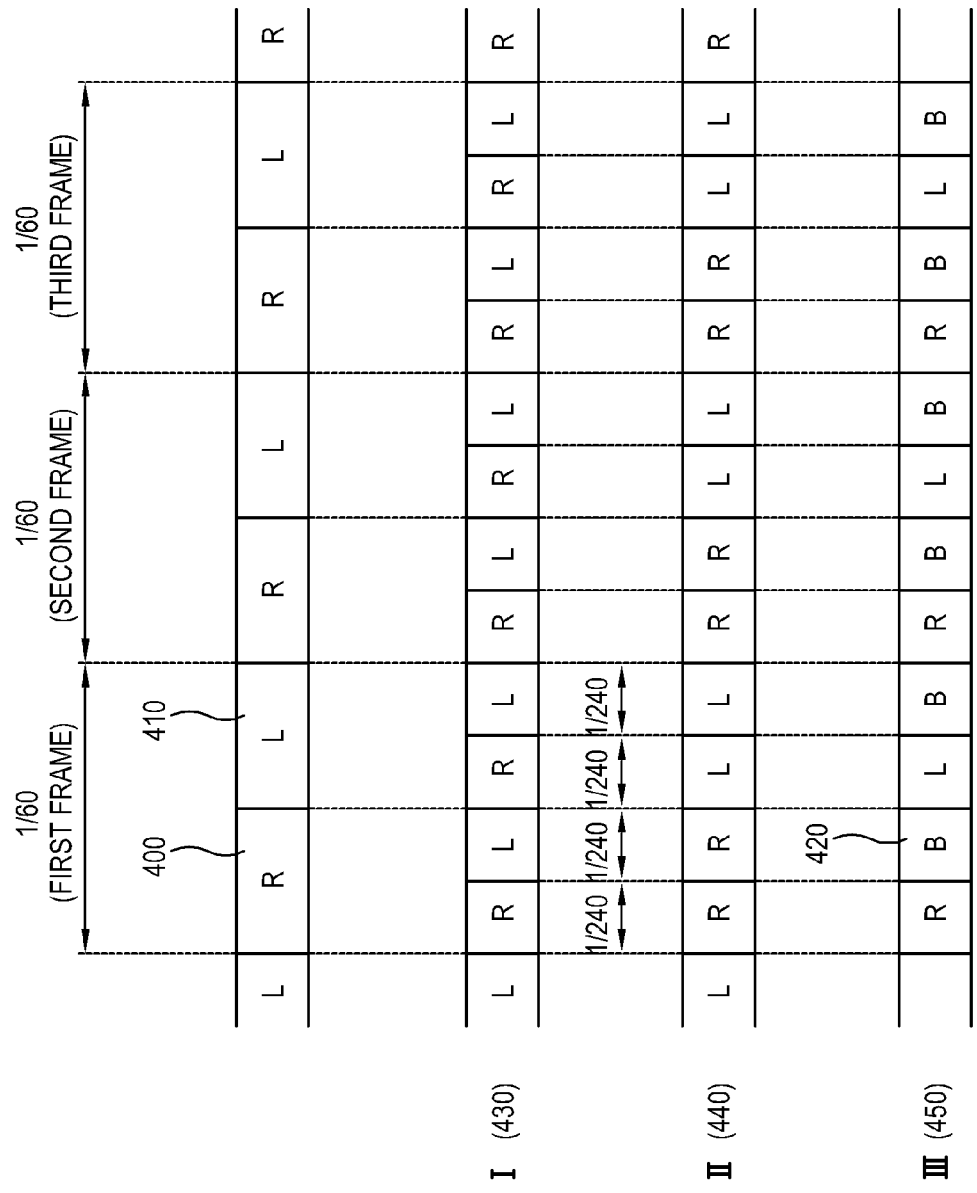
FIG. 4 is a view for explaining operation of a display apparatus according to another exemplary embodiment.

FIG. 4 is a view for explaining operation of a display apparatus according to another exemplary embodiment.

Referring to FIG. 4, the controller 140 receives video signals where each of the left-eye image and the right-eye image forms one individual frame. In FIG. 4, R 400, L 410 and B 420 indicate a right-eye image, a left-eye image, and a black image, respectively.

If the display apparatus 10 in this exemplary embodiment is driven at 60 Hz, one frame is displayed for 1/60 seconds. In the case of a 3D image, since an image corresponding to one frame is displayed by the left-eye image and the right-eye image, both the left-eye image and the right-eye image 3D-processed by the signal processor 110 have to be displayed for 1/60 seconds. FIG. 4 shows that the left-eye image and the right-eye image undergo the 3D image processing and are driven at 240 Hz with respect to 60 Hz. When driven at 240 Hz, each of the left-eye image and the right-eye image is displayed for 1/240 seconds, i.e., 1/60 seconds is totally taken to display an image corresponding to one frame.

Referring to FIG. 4, I 430 and II 440 show that total four left- and right-eye images are displayed as an image corresponding to one image. That is, I 430 shows that the left-eye image, the right-eye image, the left-eye image and the right-eye image are each displayed for 1/240 seconds and cumulatively displayed for 1/60 seconds as one frame. II 440 shows that each of the left-eye image, the left-eye image, the right-eye image and the right-eye image is displayed for 1/240 seconds.

III 450 shows that the black image is inserted. For driving at 240 Hz, the right-eye image is displayed and then the black image is displayed for 1/240 seconds, and the left-eye image is displayed and then the black image is displayed for 1/240 seconds.

If the video signal corresponding to I 430 to III 450 is input to the image sorting unit 200, the image sorting unit 200 divides the video signal into the left-eye image and the right-eye image and transmits the right-eye image to the first dimming information unit 210 and the left-eye image to the second dimming information unit 220. At this time, there is no need for acquiring the dimming information with regard to the black image, and therefore the black image is not processed.

In this exemplary embodiment, since the left-eye image and the right-eye image are processed by the 3D image processing and there is correlation between neighboring images, the first and second dimming information units 210 and 220 acquire the dimming information in consideration of the correlation between the left-eye images and between the right-eye images.

The image compensating unit 230 performs image compensation with regard to the left-eye image and the right-eye image on the basis of the dimming information about the left-eye image and the right-eye image. Because the compensated image has already been processed by the 3D image processing, the image is transmitted to and displayed on the display unit 120. Also, the first and second dimming information units 210 and 220 transmit the dimming information to the light source unit 130. At this time, the left-eye image and the right-eye image are directly output without considering the foregoing delay time since the left-eye image and the right-eye image have already been processed to be displayed on the display unit 120.

FIG. 5 is a flowchart showing operation of a display apparatus according to an exemplary embodiment.

As shown in FIG. 5, if the signal receiver 100 receives a video signal containing a left-eye image and a right-eye image, the signal processor 110 performs signal processing so that a 3D image can be displayed on the display unit 120 (500). The signal processing of the signal processor 110 may be distinguished with respect to the 3D image processing. Before the 3D image processing, both the left-eye image and the right-eye image are contained in one frame. On the other hand, after the 3D image processing, each of the left-eye image and the right-eye image forms one individual frame.

If the image sorting unit 200 receives the left-eye image and the right-eye image which are not processed by the 3D image processing (No of 510), the image sorting unit 200 divides the left-eye image and the right-eye image (520). The divided left-eye and right-eye images are transmitted to the first and second dimming information units 210 and 220, so that the dimming information can be acquired (530). At this time, only one of the first and second dimming information units 210 and 220 may operate. When all the dimming information about the left-eye image and the right-eye image is acquired, each dimming information may be output, or one of the average value, the maximum value and the minimum value of the respective dimming information may be output.

Meanwhile, the dimming information output from the first and second dimming information units 210 and 220 is transmitted to the light source unit 130 (540) and transmitted to the image compensating unit 230. Then, the image compensating unit 230 compensates the left-eye image and the right-eye image on the basis of the dimming information (550).

When the compensated left-eye and right-eye images are displayed on the display unit 120, the light source unit 130 emits light to the display unit 120 on the basis of the dimming information, thereby displaying a 3D image (560).

If the left-eye image and the right-eye image are processed by the 3D image processing and then input to the image sorting unit 200 (Yes of 510), the left-eye image and the right-eye image are transmitted to the first and second dimming information units 210 and 220 since the left-eye image and the right-eye image are previously divided, so that the dimming information can be acquired (530). Consequently, the 3D image is displayed by the method described as above (560).

As described above, since the light is controlled on the basis of the dimming information of at least one of the left-eye image and the right-eye image, the local dimming suitable for the 3D image is possible to thereby provide a vivid 3D image.

Further, it is possible to prevent wasteful power consumption in displaying a 3D image.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:
a signal receiver which receives a video signal, the video signal including a left-eye image and a right-eye image;
a signal processor which processes the received video signal;
a display unit which displays a three-dimensional (3D) image on the basis of the processed video signal;
a light source unit which emits light to the display unit; and
a controller which transmits dimming information of the left-eye image and the right-eye image of the processed video signal to the light source unit and controls the light source unit to be driven on the basis of the dimming information,
wherein the controller acquires the dimming information based on the video signal,
wherein the video signal comprises the video signal in which the left-eye image and the right-eye image form respective frames,
wherein the dimming information comprises a first dimming information on the left-eye image and a second dimming information on the right-eye image,
wherein the controller acquires the first dimming information and the second dimming information based on a correlation between the left-eye image and the right-eye image which are neighboring each other, and
wherein the signal processor processes the received video signal by configuring the received video signal such that each frame of the processed video signal comprises the left-eye image and the right-eye image neighboring each other in each frame.

2. The display apparatus according to claim 1, wherein the controller comprises:
a first dimming information unit that acquires the first dimming information of the right-eye image; and
a second dimming information unit that acquires the second dimming information of the left-eye image.

3. The display apparatus according to claim 1, wherein the controller compensates the left-eye image and the right-eye image for brightness on the basis of the dimming information.

4. The display apparatus according to claim 3, wherein the controller controls a value of brightness compensation for the left-eye image and the right-eye image to be inversely proportional to a value of the dimming information.

5. The display apparatus according to claim 1, wherein the controller provides the first dimming information about the left-eye image and the second dimming information about the right-eye image to the light source unit, and the light source unit emits light corresponding to the left-eye image and the right-eye image displayed on the display unit.

6. The display apparatus according to claim 1, wherein the controller provides only one of dimming information about the left-eye image and the right-eye image to the light source unit.

7. The display apparatus according to claim 1, wherein the controller provides an average value of dimming information about the left-eye image and the right-eye image to the light source unit.

8. The display apparatus according to claim 1, wherein the controller provides a maximum value of dimming information about the left-eye image and the right-eye image to the light source unit.

9. The display apparatus according to claim 1, wherein the controller provides a minimum value of dimming information about the left-eye image and the right-eye image to the light source unit.

10. A method of driving a display apparatus comprising a plurality of light emitting diodes (LEDs), and a light source unit emitting light by local dimming, the method comprising:
   processing a video signal, the video signal including a left-eye image and a right-eye image;
   providing dimming information about the left-eye image and the right-eye image to the light source unit;
   driving the light source unit based on the dimming information; and
   displaying a three-dimensional (3D) image based on the driven light source unit,
   wherein the providing the dimming information comprises acquiring the dimming information based on the video signal,
   wherein the video signal comprises the video signal in which the left-eye image and the right-eye image form respective frames,
   wherein the dimming information comprises a first dimming information on the left-eye image and second dimming information on the right-eye image, and
   wherein the providing the dimming information comprises acquiring the first dimming information and the second dimming information based on a correlation between the left-eye image and the right-eye image which are neighboring each other,
   wherein the processing the video signal comprises processing the video signal such that each frame of the processed video signal comprises the left-eye image and the right-eye image neighboring each other in each frame.

11. The method according to claim 10, wherein the providing the dimming information comprises:
   acquiring the first dimming information of the left-eye image; and
   acquiring the second dimming information of the right-eye image.

12. The method according to claim 10, wherein the providing the dimming information comprises: compensating the left-eye image and the right-eye image for brightness on the basis of the dimming information.

13. The method according to claim 12, wherein the compensating the left-eye image and the right-eye image comprises compensating a value of brightness compensation for the left-eye image and the right-eye image to be inversely proportional to a value of the dimming information.

14. The method according to claim 10,
   the displaying the 3D image comprises emitting light corresponding to the displayed left-eye and right-eye images.

15. The method according to claim 10, wherein the providing the dimming information comprises providing only one of dimming information about the left-eye image and the right-eye image to the light source unit.

16. The method according to claim 10, wherein the providing the dimming information comprises providing an average value of dimming information about the left-eye image and the right-eye image to the light source unit.

17. The method according to claim 10, wherein the providing the dimming information comprises providing a maximum value of dimming information about the left-eye image and the right-eye image to the light source unit.

18. The method according to claim 10, wherein the providing the dimming information comprises providing a minimum value of dimming information about the left-eye image and the right-eye image to the light source unit.

* * * * *